Sept. 5. 1933.  C. N. GOODALL  1,925,319
COUPLING DEVICE FOR RAILWAY AND OTHER VEHICLES
Filed Jan. 23, 1931   4 Sheets-Sheet 1
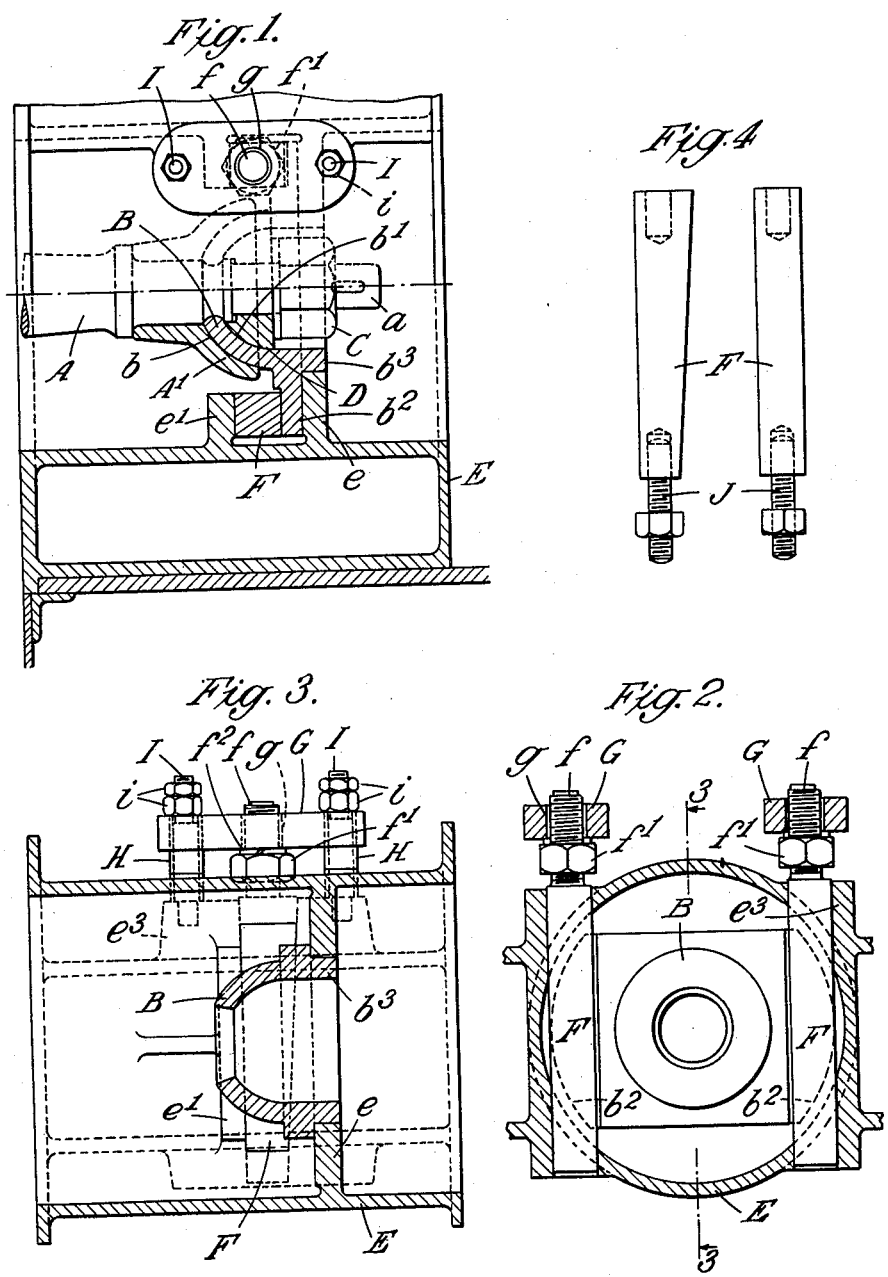

Sept. 5, 1933.　　　　C. N. GOODALL　　　　1,925,319
COUPLING DEVICE FOR RAILWAY AND OTHER VEHICLES
Filed Jan. 23, 1931　　　4 Sheets-Sheet 2
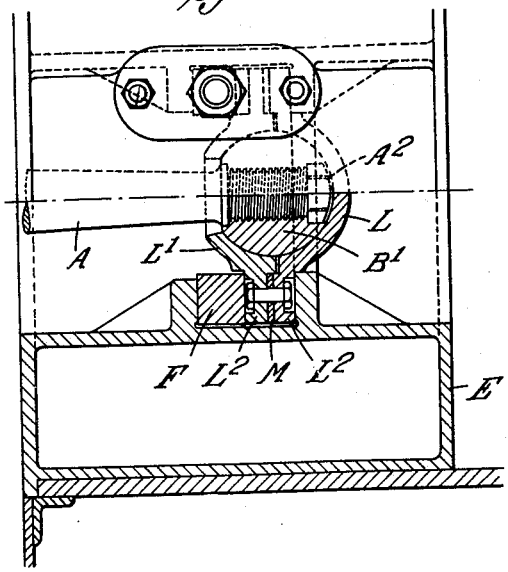
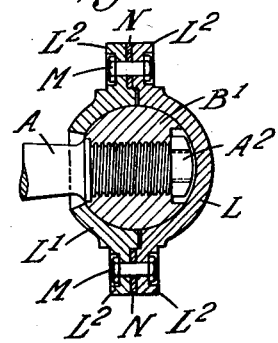
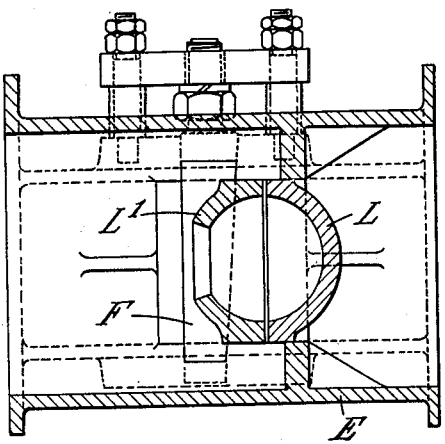
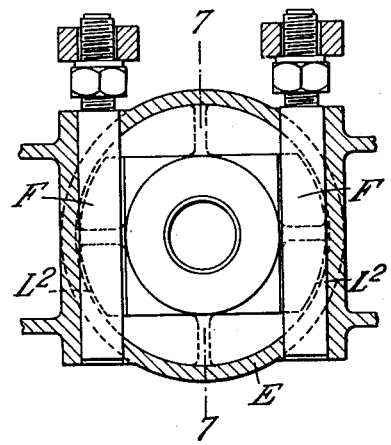
Inventor
Clarence N. Goodall
by Wilkinson & Mawhinney
Attorneys.

Sept. 5, 1933.   C. N. GOODALL   1,925,319
COUPLING DEVICE FOR RAILWAY AND OTHER VEHICLES
Filed Jan. 23, 1931   4 Sheets-Sheet 4
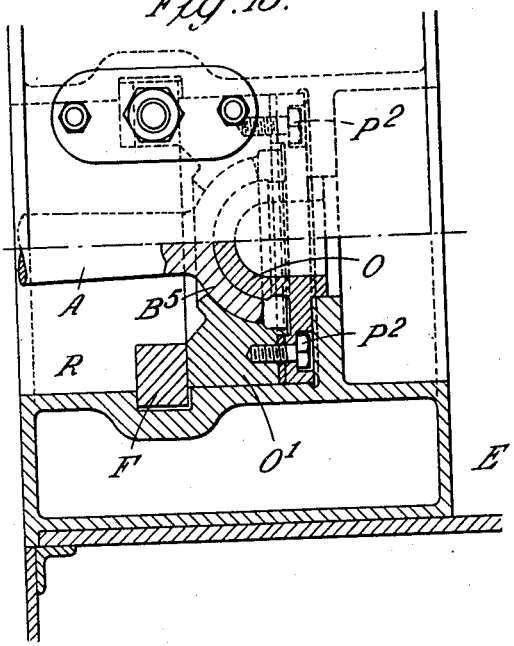
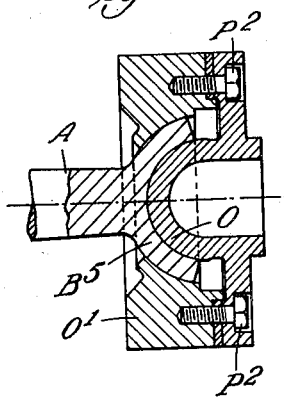
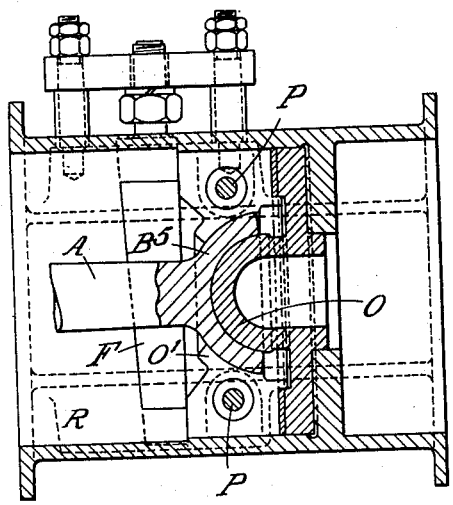
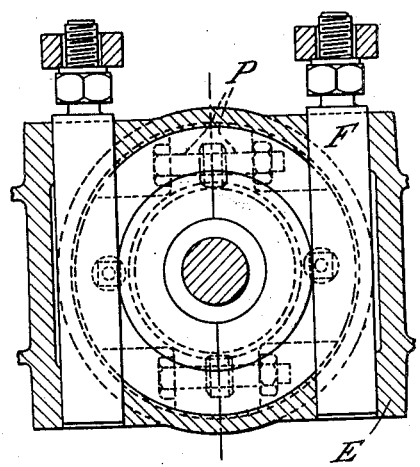
Inventor
Clarence N. Goodall
by Wilkinson & Mawhinney
Attorneys.

Patented Sept. 5, 1933

1,925,319

UNITED STATES PATENT OFFICE 1,925,319

COUPLING DEVICE FOR RAILWAY AND OTHER VEHICLES

Clarence Noel Goodall, Darlington, England

Application January 23, 1931, Serial No. 510,807, and in Great Britain May 12, 1930

10 Claims. (Cl. 213—74)

This invention relates to devices for coupling railway or other vehicles and has for its chief object the provision of an articulated connection for firmly coupling two train units together.

According to the invention the coupling comprises a draw or push bar so constructed at its extremities as to form a means of connection permitting a certain freedom of movement in all directions except longitudinally.

Said means of connection may comprise a draw or push bar provided with a cup-shaped socket adapted to form a ball and socket joint with a fixed hemispherical member.

A coupling member of the type referred to is shown in my prior Patent No. 1,497,329.

Alternatively, said means of connection may comprise a fixed member in the form of a hollow sphere divided into halves, one half having an axial bore or opening. The halves may be fitted together by flanges provided with suitable bolts or screws. The flanges when bolted or screwed together may form a means for securing the complete member to any convenient part of the vehicle, in such a position as to be centrally disposed with respect to the vehicle.

Fitted within the hollow sphere may be a ball having a hole throughout its axis, said hole being recessed at each end and screwed as to its centre portion.

The draw or push bar may be of any appropriate form to withstand sudden shocks, such as buffing shocks. Each end of the said bar may be in the form of a screwed portion furnished with a collar of such size as to pass through the bore or opening of the fixed member. The screwed portion may fit into the ball, the collar abutting upon the outer recess of the ball. At the extremities of the bar may be formed a square lying within the inner recess of the ball, said recess being also square in form but larger than the square on the bar. A square washer or securing member may be firmly fitted over the end of the bar and into the recess of the ball and further secured by a pin or dowel to prevent the screwed portion of the bar from turning in the ball.

Alternatively, the extremities of the bar may be formed with a left or opposite hand thread to that passing through the ball and fitted with a nut abutting on the bottom of the recess or with any other appropriate means of preventing said bar from turning in the ball.

A liner may be provided between the flanges of the fixed member to take up the wear between the ball and the fixed member.

In order that the invention may be clearly understood and readily carried into effect, the same will now be more fully described by the aid of the accompanying drawings, in which:—

Fig. 1 is a plan of one end of a drawbar coupling of the type described in Patent No. 1,497,329 granted March 3, 1921 one side being in section.

Fig. 2 is a cross section.

Fig. 3 is a section on the line 3—3 of Fig. 2.

Fig 4 represents a modified construction of the wedges.

Fig. 5 is a plan of the alternative form of ball and hollow sphere device.

Fig. 6 is a cross section of the same.

Fig. 7 is a section on the line 7—7 of Fig. 6.

Fig. 8 is a sectional plan of the spherical fixed member and ball.

Fig. 13 is a plan of a further alternative showing a drawbar having cup-shaped ends integral with the bar, and corresponding hollow hemispherical bearing with socket-like cap forming a housing within which the cup-shaped ends move about a common centre.

Fig. 14 is a sectional elevation of the same.

Fig. 15 is a cross section of the same.

Fig. 16 is a detail of the cup-shaped end with the hemispherical bearing or housing in which it works.

Figure 9:
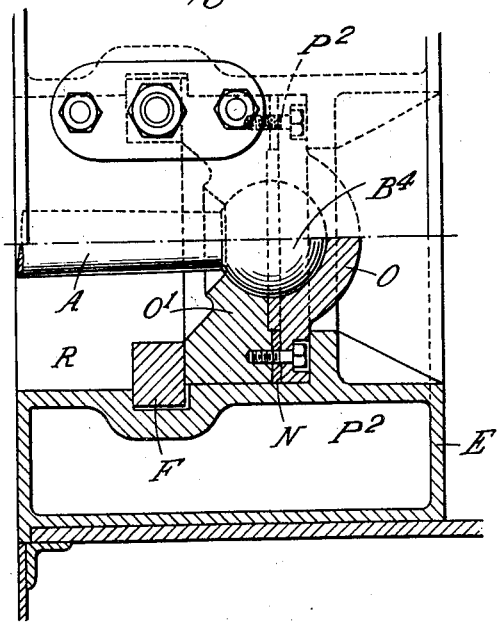
Fig. 9 is a plan partly in section of an alternative form of construction comprising a drawbar having spherical ends integral with the bar, and corresponding sockets or housing fixed by wedges into the engine frame.

Referring to Figs. 1 to 4:

A is the drawbar provided with the cup-shaped socket A' engaging with the hemispherical surface $b$ of the fixed member B. A nut C on the reduced end $a$ of the drawbar A retains a hemispherical block D in contact with the inner surfaces $b'$ of the fixed member B. The block D and the member B are each provided with a central aperture through which the end $a$ of the drawbar is passed.

A flange $b^2$ on the member B rests against a seating $e$ of the frame E and is secured in position by two vertical wedges F forced between the flange $b^2$ and abutments $e'$ integral with the frame.

The flange $b^2$ of the member B may be inclined or tapered in either direction to allow of the insertion of the wedges from the top or bottom face of the framework.

An extension $b^3$ is provided on the member B for locating its position in the seating E.

The wedges F are provided, in the example illustrated, at their upper ends, with a screw-threaded extension $f$ and a nut $f'$ over which a removable bridge piece G is placed with the interposition of a strong spring washer $f^2$, an aperture $g$ allowing the bridge piece to be slipped over the extension $f$. The bridge piece G rests on two or more distance pieces H at each end supported on a boss $e^3$ of the frame E and is held down in contact with the washer $f^2$ by studs I and nuts $i$.

By rotating the nut $f'$ so that the washer $f^2$ is pressed against the bridge piece, the wedge F is fixed firmly in position.

In order to withdraw the wedge, the bridge piece G is temporarily removed by unscrewing the nuts $i$; the nut $f'$ and the upper of the distance pieces H and the spring washer $f^2$ are also removed. The bridge piece is then replaced, and the nut $f'$ replaced on the extension $f$ of the wedge, and screwed down on the bridge piece, which then acts as a support.

After the withdrawal of the wedges the fixed member B is rotated until the flanges are free of the abutments $e'$ enabling the end of the bar complete with all its fittings to be withdrawn from the frame E of the vehicle.

In a modification shown in Fig. 4, the screwed extensions integral with the wedges F, are replaced by studs J, screw-threaded into the wedges. By providing a tapped bore at each end of the wedges, the bridge pieces can be arranged either above or below the wedges.

Referring to Figs. 5 to 8:

A is the drawbar provided with a collar and screwed portion at each end and terminating in a locking device $A^2$. B' is a ball or sphere screwed axially to suit the screwed end of the bar and suitably recessed to receive the collar of the bar on the one side and the locking device $A^2$ on the other. L and L' are the halves of the fixed member which when bolted together by means of the flanges $L^2$ form a hollow partial sphere of the same diameter inside as the ball B', said halves being fitted together by means of an extension and secured by bolts or screws M. N is a liner for taking up wear between the fixed member and the ball. The bar A is passed through the axial opening of the half L' of the hollow partial sphere and screwed into the ball B' and secured by the locking device $A^2$. The half L of the hollow partial sphere is then secured to the half L' by means of the bolts or screws M forming a complete ball and socket joint capable of adjustment by means of the liner N. The flanges $L^2$ of the fixed member which are inclined or tapered on one side rest against the seating of the frame E and are secured in position by the vertical wedges F. The wedges are fixed in position and withdrawn as heretofore described.

Figure 12:
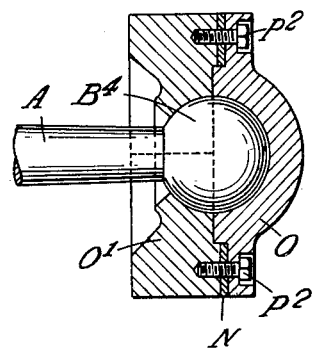
Fig. 12 is a detail of the spherical end in its sockets or housing.
Figure 10:
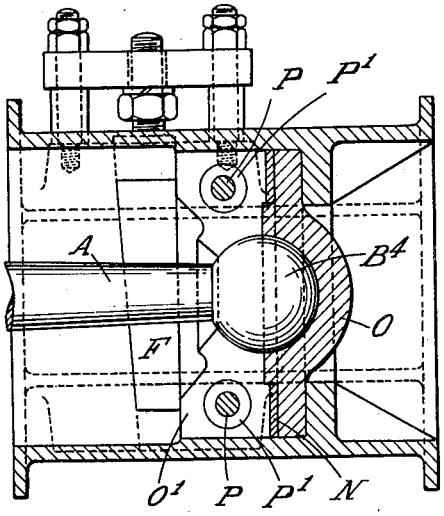
Fig. 10 is a sectional elevation of the same.
Figure 11:
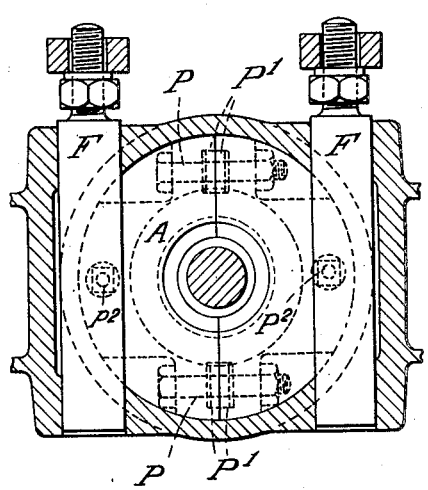
Fig. 11 is a cross section of the same.

Referring to Figs. 9 to 12:

A is the drawbar having spherical ends $B^4$ integral with the bar. O and O' comprise the housing, O being a hemispherical socket and O' another hemispherical socket in halves. The halves of O' are held together by means of the bolts P and are kept in true register by the thimbles P' fitting tightly in corresponding holes in each half of the socket O'. The halves of O' are further secured to the socket O by means of an extension and bolts or screws $P^2$. A liner N is provided for taking up the wear. The housing O and O' having been fitted over the ball end of the bar, and the three parts thereof having been secured in position by the bolts P and $P^2$, the whole end complete with its housing is inserted into the cavity R of the vehicle frame, and secured by wedges F as heretofore described.

Referring to Figs. 13 to 16:

A is the drawbar having hollow hemispherical ends $B^5$ integral with the bar. O and O' comprise the housing, O being a hollow hemispherical socket and O' another hemispherical socket in halves. The halves of O' are held together by means of the bolts P and kept in register and further secured to the socket O by an extension and bolts or screws $P^2$ as in Figs. 9—12. The housings O and O' having been fitted over the cup-shaped end of the drawbar A and the three parts thereof secured in position by the bolts P and $P^2$ the whole end with its housing complete is inserted into the cavity R of the vehicle frame, and secured by wedges as heretofore described.

Having thus described the nature of the said invention and the best means I know of carrying the same into practical effect, I claim:—

1. In combination, a frame having a seating and abutments spaced from the seating, said abutments having spaces therebetween, a member centered upon said seating and having spaced flanges engaging against the seating and adapted to be brought opposite the spaces between the abutments for removal of the member, wedges driven removably between said flanges and the abutments, and means for moving the wedges into and out of position.

2. In combination, a frame having a seating and abutments spaced from the seating, said abutments having spaces between the same, a member having a part centered in said seating and flanges engaging against said seating and being rotatable through approximately 90° to come opposite the spaces between the abutments, wedges removably interposed between the abutments and said flanges, and means for retaining the wedges in place.

3. A railway coupling for railway vehicles comprising a frame on the vehicle and having a seating and abutments spaced from the seating, said abutments having spaces between the same, a drawbar having a socket, a member having a portion received by said socket, said member and drawbar being movable with respect to one another, said member having an extension centered in said seating and flanges engaging against said seating and being rotatable through approximately 90° to come opposite the spaces between the abutments, retaining means for holding said member and said socket in assembled relation, wedging means removably interposed between the abutments and said flanges for retaining said member and drawbar in position upon said frame, and retaining means for holding the wedging means in place.

4. A railway coupling for railway vehicles comprising a frame on the vehicle and having a seating and abutments spaced from the seating, said abutments having spaces between the same, a drawbar having a socket, a member having a semi-spherical portion received by said socket to permit a universal movement between said drawbar and said member, said member having an extension centered in said seating and flanges engaging against said seating and being rotatable through approximately 90° to come opposite the spaces between the abutments, retaining means for holding said member and said socket in assembled relation, wedging means removably interposed between the abutments and said flanges for retaining said member and drawbar in position upon said frame, and means for moving the wedging means into and out of position.

5. A railway coupling for railway vehicles comprising a frame on the vehicle and having a seating and abutments spaced from the seating and from one another, a drawbar having a cup-shaped socket, a member having a semi-spherical portion received by said socket to permit a universal movement between said drawbar and said member, said member having flanges engaging said seating, retaining means for holding said member and said socket in assembled relation, wedges engaging between said flanges and said abutments, and means for moving the wedges into and out of operative position.

6. A railway coupling for railway vehicles comprising a frame on the vehicle and having a seating and abutments spaced from said seating and from one another, a drawbar having a cup-shaped socket, a member having a semi-spherical portion received by said socket to permit universal movement between said drawbar and said member, said member having oppositely projecting flanges engaging against said seating and being rotatable with respect to said abutments to bring said flanges opposite the spaces between said abutments, wedges engaging between said flanges and abutments, means being provided for holding the drawbar and the member in their assembled position, and means for moving the wedges into and out of operative position.

7. A railway coupling for railway vehicles comprising a frame on the vehicle and having a spaced seating and abutment, a drawbar having a socket, a member engaging against said seating, and having a portion received by said socket, said member and drawbar being movable with respect to one another, a wedge between said member and abutment, a bridge piece engaging the wedge, means being provided for holding the drawbar and the member in their assembled position, and means engaging the wedge piece for holding the same in position.

8. A railway coupling for railway vehicles comprising a frame on the vehicle and having a seating and an abutment spaced apart, a drawbar having a socket, a member engaging against said seating and having a portion received by said socket, said member and drawbar being movable with respect to one another, a wedge engaging between said member and said abutment, said wedge having a screw portion, a nut upon the screw portion, a spring washer on the nut, a bridge piece having an intermediate opening for engaging over the screw portion upon the spring washer, means being provided for holding the drawbar and the member in their assembled position and means engaging with the end parts of the bridge piece for holding the wedge in position.

9. A railway coupling for railway vehicles comprising a frame on the vehicle and having a seating and an abutment, a drawbar having a socket, a member engaging against said seating and having a portion received by said socket, said member and drawbar being movable with respect to one another, a wedge engaging between said member and abutment and having a projecting portion, a spring member on the projecting portion, a bridge piece engaging at its central portion over the projecting portion and upon the spring member, means for shifting the spring member against the intermediate portion of the bridge piece, means being provided for holding the drawbar and the member in their assembled position and means engaging the outer end portions of the bridge piece for holding the wedge in position.

10. A railway coupling for railway vehicles comprising a frame on the vehicle and having opposed parts, a drawbar having a socket, a member having a portion received by said socket, said member and drawbar being movable with respect to one another, said member engaging one of said frame parts, a wedge engaging between said member and the other frame part, said wedge having a screw projecting end, a nut threaded thereon, a spring washer on the nut, a bridge piece having a central opening fitted over the screw end and resting on the washer, removable distance pieces supporting the ends of the bridge piece, screw studs associated with the distance pieces, and nuts on the studs engaging the upper faces of the end parts on the bridge piece, means being provided for holding the drawbar and the member in their assembled position.

CLARENCE NOEL GOODALL.